May 9, 1967 E. W. JACOBSON 3,317,984
BROACH
Filed Jan. 25, 1965 4 Sheets-Sheet 1
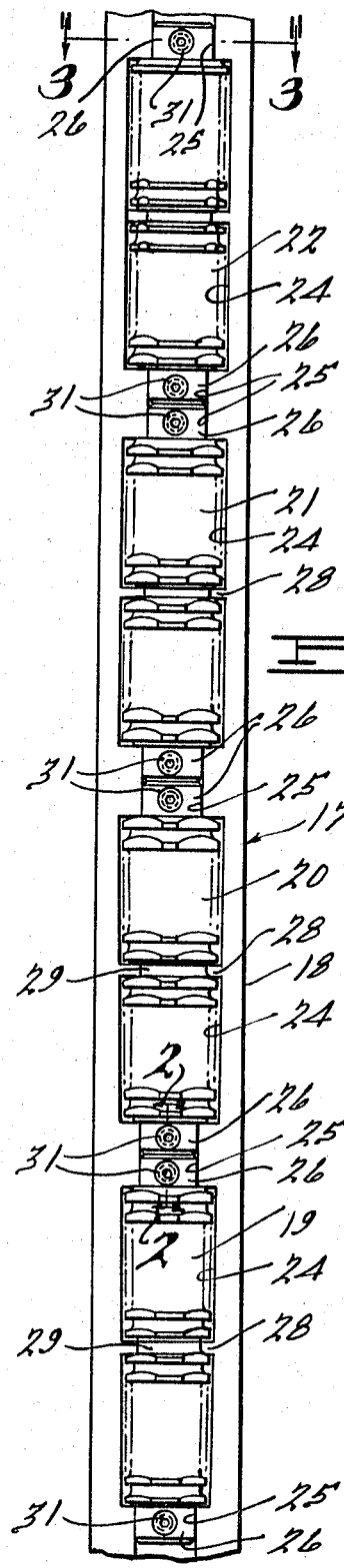
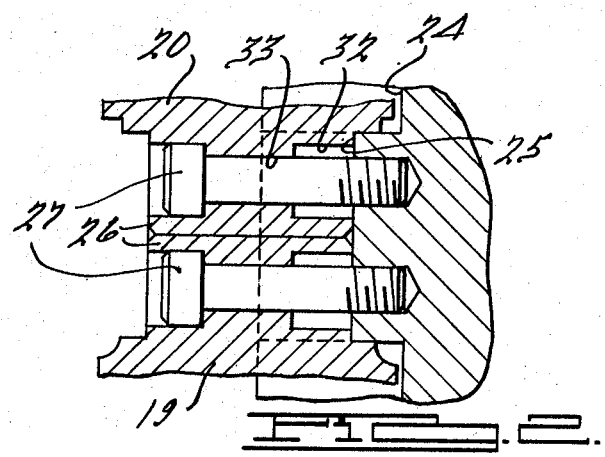
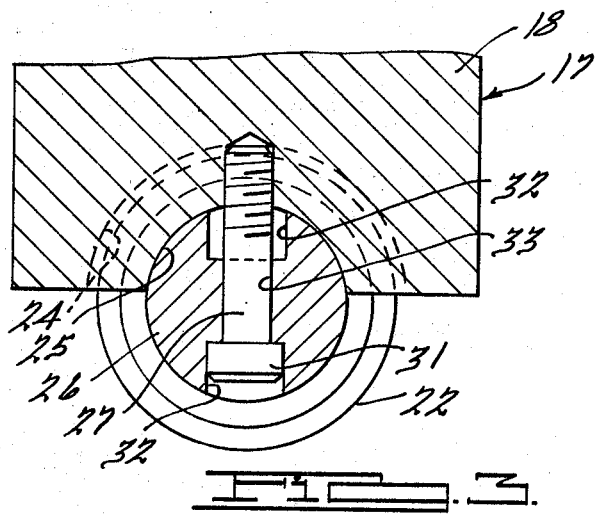
INVENTOR.
Eric W. Jacobson
BY
Harness, Dickey & Pierce
ATTORNEYS

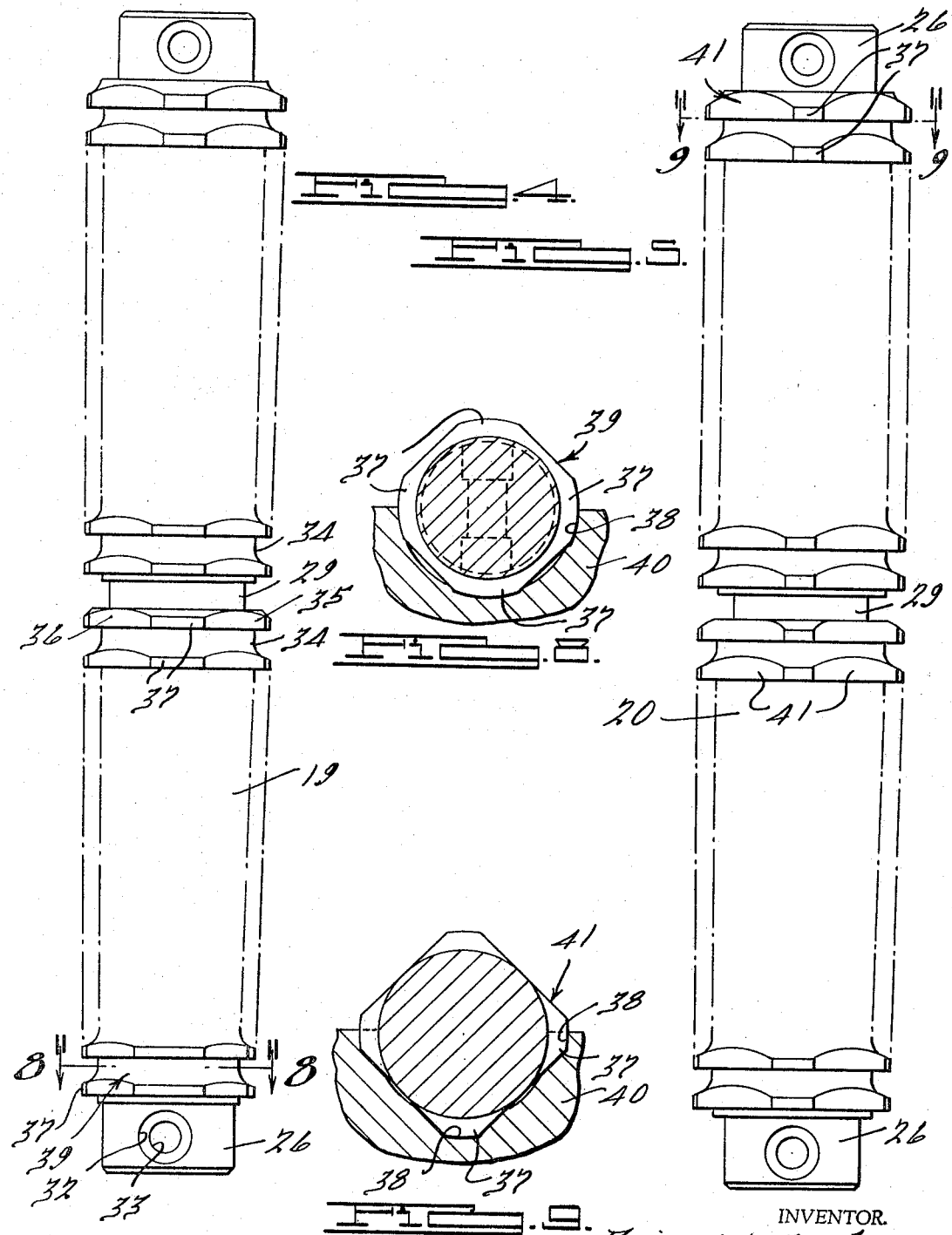

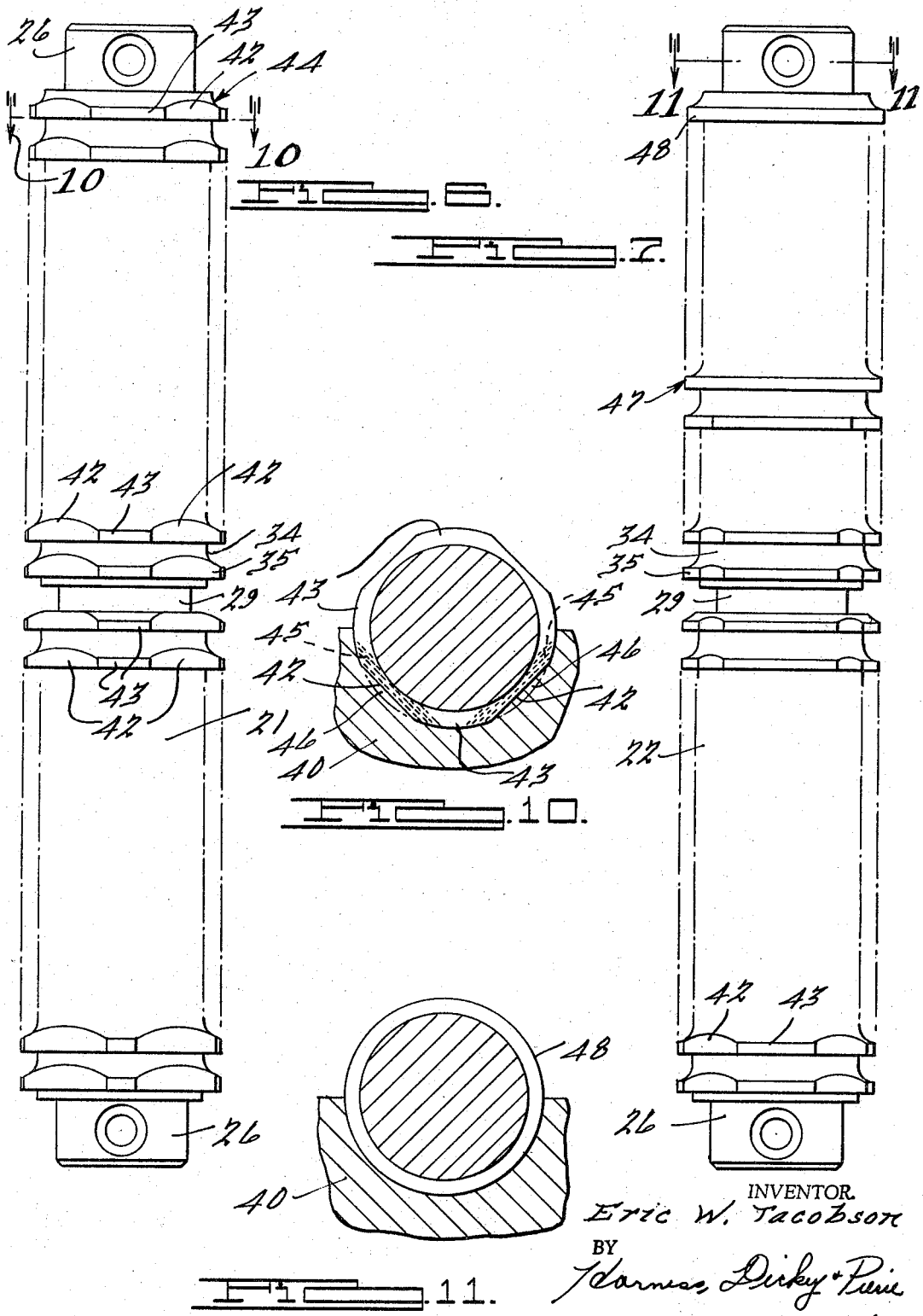

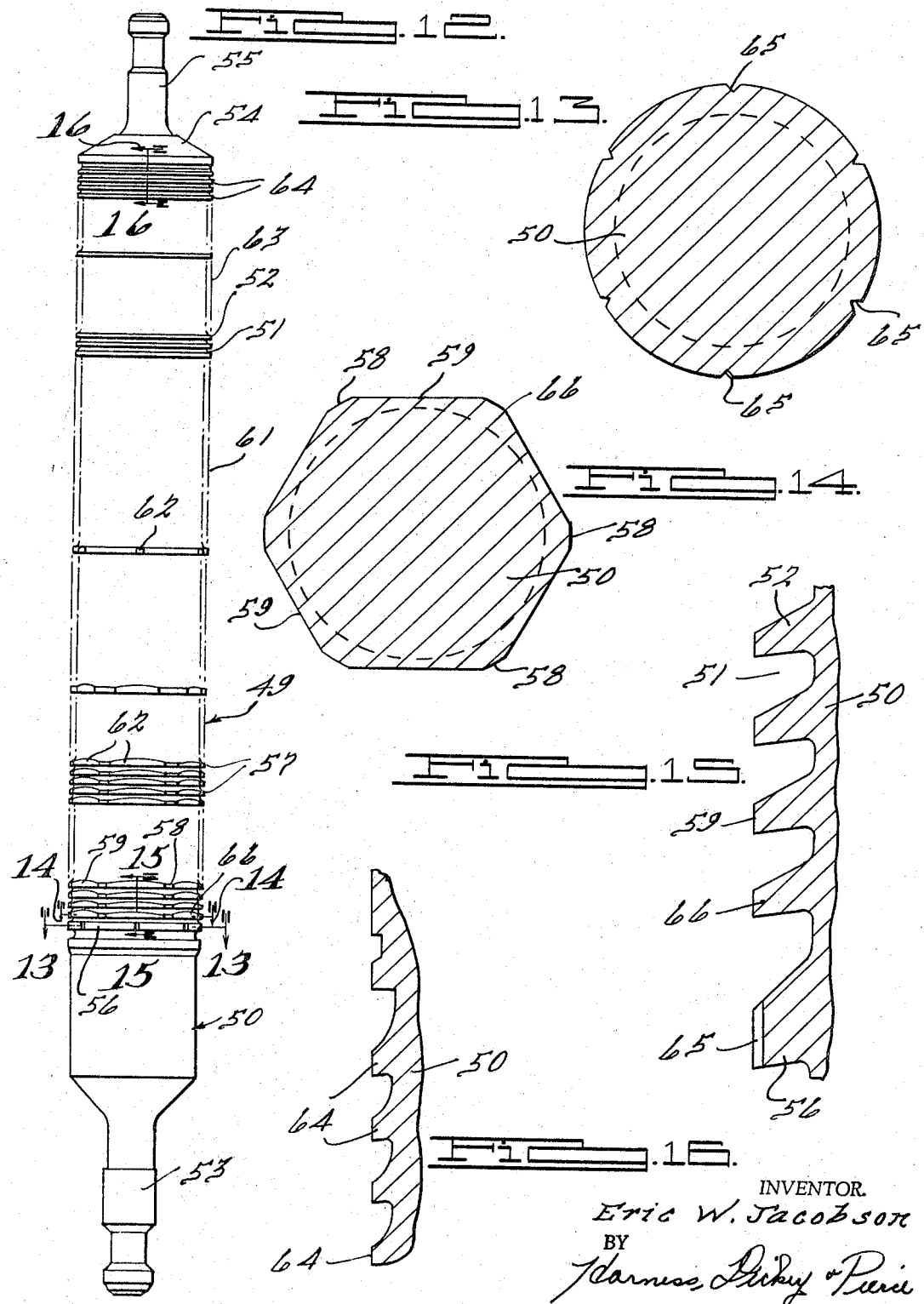

United States Patent Office 3,317,984
Patented May 9, 1967

3,317,984
BROACH
Eric W. Jacobson, Birmingham, Mich., assignor to Colonial Broach & Machine Company, Warren, Mich., a corporation of Delaware
Filed Jan. 25, 1965, Ser. No. 427,680
13 Claims. (Cl. 29—95.1)

This invention pertains to broaches, and particularly to a broach which first cuts spaced slots substantially to depth in the bore of a workpiece and thereafter removes the metal remaining between the slots.

The broach of the present invention is of substantial length having a plurality of transverse grooves providing spaced lands, which form stepped cutting edges. The lands in a forward section increase in diameter. The lands in a rearward section are substantially of the same diameter followed and annular lands in a finishing section are of increasing diameters. A plurality of flat areas are cut in the lands, all or different portions of the flats in the forward section being parallel to the axis of the broach body providing cutting teeth at the corners between the flats which increase in length and broach spaced slots in the bore of the workpiece. The flats areas, in continuation of those of the front section, taper outwardly in the rearward section and provide straight cutting edges which progressively move outwardly from the axis of the broach body. These cutting edges progressively cut the material remaining between the slots which machine the bore substantially to diameter. The annular lands in the finishing section cut the bore progressively larger until a plurality of lands at the end of the same diameter, accurately machine the bore to exact diameter. The plurality of finishing teeth of the same diameter will be used up as the teeth are sharpened until near the end of the broach life, the last tooth will become the finishing tooth for the bore. Thus, the flat areas will be of the same length for all or a series of the lands in the forward section. The flat areas in the lands of the rearward section will progressively lengthen toward the end of the broach due to the sloping of the flats outwardly from the axis of the broach body.

Two forms of broaches are herein illustrated, one made up of sections which are supported in a trough-like body having cradles therein upon which cylindrical portions at the ends of each section rest and through which screws extend for securing the sections to the trough-like body. Only one half of the sections are employed for cutting semi-cylindrical apertures to a predetermined radius and when one side of the sections become worn, the sections may be rotated 180° to have the unworn portion do the cutting until all of the teeth become dulled, after which the teeth are sharpened. Both of the broaches, however, function in the same manner, the forward section of the broach cutting slots substantially to depth in the bore of the workpiece, the rearward section cutting the material left between the slots and the finishing section cutting the cylindrical or semi-cylindrical aperture to exact diameter or radius. The trough-like body of the sectional broach is mounted on a reciprocal member, and after the workpiece is secured in a fixture with a semicylindrical aperture in proper alignment with the broach, the broach is then drawn across the aperture to machine it to exact radius. The unit broach is provided with releasable attaching end portions, the upper end being engageable by a handling head which raises the broach above the work loading fixture and passes the broach downwardly through the workpiece when secured thereon. The pull end projects below the workpiece and is engaged by a pull head which pulls the broach through the workpiece after the handling end has been released. After the broach has been pulled through the workpiece and the workpiece has been removed, the handling head again engages the handling end and raises the broach upwardly so that another workpiece can be placed upon the work receiving fixture.

Accordingly, the main objects of the invention are: to provide a broach which cuts spaced slots in the bore of a workpiece substantially to a desired radius or diameter and thereafter progressively removes the metal from between the slots, after which the bore is machined to a desired radius or diameter; to provide a broach having forward, rearward and finishing sections, the forward section being tapered and provided with spaced lands which have flat areas cut therein to form cutting teeth at the corners which progressively increase in length, with aligned flats on the rearward section sloping outwardly to progressively cut the metal between the slots with the finishing section removing the remaining metal to an exact radius or diameter; to provide the lands of a broach having a forward tapered section, and rearward and finishing cylindrical sections with flat areas, those in the forward section being parallel to the axis of the bore and of substantially the same length as those in the rearward section, tapering outwardly and of progressively increasing length, and in general, to provide a broach which is simple in construction, positive in operation and economical of manufacture.

Other objects and features of novelty of the invention will be specifically pointed out or will become apparent when referring, for a better understanding of the invention, to the following description taken in conjunction with the accompanying drawings, wherein:

FIGURE 1 is a plan view of a broach for machining semi-cylindrical apertures which embody features of the present invention;

FIG. 2 is a large broken sectional view of the structure illustrated in FIG. 1, taken on the line 2—2 thereof;

FIG. 3 is an enlarged broken sectional view of the structure illustrated in FIG. 1, taken on the line 3—3 thereof;

FIG. 4 is an enlarged view of the first section of the broach illustrated in FIG. 1;

FIG. 5 is an enlarged view of the second section of the broach illustrated in FIG. 1;

FIG. 6 is an enlarged view of the third section of the broach illustrated in FIG. 1;

FIG. 7 is an enlarged view of the fourth section of the broach illustrated in FIG. 1;

FIG. 8 is a sectional view of the structure illustrated in FIG. 4, shown in engagement with a workpiece;

FIG. 9 is a sectional view of the structure illustrated in FIG. 6, shown in engagement with a workpiece;

FIG. 10 is a sectional view of the structure illustrated in FIG. 6, shown in engagement with a workpiece;

FIG. 11 is a sectional view of a structure illustrated in FIG. 7, shown in engagement with a workpiece;

FIG. 12 is a view of a broach, similar to that illustrated in FIG. 1, constructed as a unit for cutting and finishing a cylindrical aperture in a workpiece;

FIG. 13 is an enlarged sectional view of the structure illustrated in FIG. 1, taken on the line 13—13 thereof;

FIG. 14 is an enlarged sectional view of the structure illustrated in FIG. 12, taken on the line 14—14 thereof;

FIG. 15 is an enlarged broken sectional view of the structure illustrated in FIG. 12, taken on the line 15—15 thereof, and FIG. 16 is an enlarged broken sectional view of the structure illustrated in FIG. 12, taken on the line 16—16 thereof.

Referring to FIGS. 1 to 11, the one form of broach 17 comprises a trough-like body 18 containing aligned broaching sections 19, 20, 21 and 22. The body has a cavity 24 containing semi-cylindrical cradles 25 which receive cylindrical ends 26 of the sections which are secured thereto by screws 27. Additional cradles 28 have semi-cylindrical recesses engaged by cylindrical portions 29 in the body of the sections midway between the ends 26. The cradles 28 back up the central portion of the broach sections and prevent any tendency to deflect during a machining operation. It will be noted that the head 31 of the screw 27 is recessed in an aperture 32 in the end of a screw hole 33. A similar aperture 32 is provided at the opposite end of the hole 33 for the reception of the head 31 of the screw. This permits the broach sections to be rotated 180° when the one side becomes dulled so that the other side may be employed for machining the wall of the semi-cylindrical aperture.

Referring more specifically to FIGS. 4, 5, 8 and 9, the broach section 19 has a plurality of annular spaces 34 forming a plurality of lands 35. The lands of the sections 19 and 20 have aligned flats 36 thereon, herein illustrated as four in number, providing teeth 37 at the corners therebetween. The teeth 37 become longer, tapering outwardly from the front to the rear of each section for progressively machining the slots 38 in the bone of the workpiece. As illustrated in FIG. 8, the teeth 37 of the land 39 begin the cut, and in FIG. 9 the teeth 37 of the land 41 finish the cutting of the slots 38. All or two or more groups of lands have flats 36 located the same distance from the center of the two broach sections and progressively increase in length as the teeth 37 become longer.

Referring more specifically to FIGS. 6, 7, 10 and 11, the broach sections 21 and 22 have the flats 42 and the teeth 43 thereof progressively cut the metal of a workpiece 40 remaining between the slots 38, as illustrated in FIG. 10. The flats 42 and teeth 43 of the land 44 of the section 21, has machined the material 45 from between the slots 38, as illustrated by the dot and dash lines and the chordal section 46, which is to be removed by the flats and teeth of the broach section 22 forwardly of the land 47. In this manner the semi-cylindrical aperture is machined substantially to size and is finished to exact size by the plurality of annular cutting teeth 48 of increasing diameter provided on the remaining end of the broach section 22. The flats 42 slope outwardly to the annular cutting teeth 48 and decrease progressively in length.

In operation, the trough-like body 17 is secured in fixed relation to a reciprocable member and the workpiece having the semi-cylindrical aperture to be machined to a desired radius, is secured thereto with the center of the broach located on the center of the finished semi-cylindrical aperture of the workpiece. The body 17 with the small end of the broach located forwardly is advanced through the semi-cylindrical aperture of the workpiece in a single pass to perform and complete the machining operation. Initially, the slots 38 are machined in the aperture followed by the removal of the material therebetween and the machining of the semi-cylindrical aperture substantially to the radius desired. The annular end teeth of the broach finish the aperture to exact radius and complete the machining operation during the single pass of the broach. Thereafter the workpiece is removed and the broach is returned to its initial position from which it will be advanced to machine the aperture in the second workpiece as soon as it is mounted in the fixture.

Referring to FIGS. 12 to 16, a broach 49 is illustrated which is used to machine the wall of a cylindrical bore in a workpiece. The broach has a body 50 containing a plurality of annular spaces 51 forming lands 52. The lower or "pull end" of the broach body 50 has an extension 53 formed to be grasped by a puller head (not shown) which is attached to a ram which draws the broach through the workpiece. The top end 54 has a similar but smaller extension 55 which is grasped by a handling head (not shown) attached to a ram for raising the broach after it has passed through the workpiece. The handling head raises the broach sufficiently to permit a workpiece to be placed in a fixture after which it is lowered to pass the broach through the bore in the workpiece to a position where the extension 53 is engaged by the pull head whereupon the handling head is released from the extension 53 to permit the pull head to draw the broach through the bore. At the pull end, a bumper tooth 56 starts the cut and produces a cylindrical hole. The next 18 teeth 57 have the lands increase in diameter to provide six cutting teeth 58 having six flats 59 therebetween which initially cut slots in the wall of the bore being enlarged. While 18 teeth is specifically mentioned as well as 6 flats 59, it is to be understood that any number of teeth or flats may be employed, depending upon the size of the bore of the workpiece or type of broaching operation that is desired. The next 49 teeth 61 are all disposed on the same diameters having flats 62 thereon which are cut on a taper toward the upper end so they progressively reduce in length to cut on cords in the bore and machine the metal between the slots produced by the teeth 58, in the manner as pointed out hereinabove with regard to the broach illustrated in FIG. 1. The remainder of the teeth 63 have annular cutting edges which progressively enlarge the hole, the last four teeth 64 being the same diameter which is the desired finished diameter of the bore of the workpiece.

The bumper tooth, as illustrated in FIGS. 13 and 15 is provided with a plurality of notches 65 which breaks up the chips produced by the cutting portions therebetween which smooths the bore to a true cylinder. The initial slot cutting tooth 66, as shown in the enlarged view of FIG. 14, has the six cutting teeth 58 initially engaging the bore to start the cut of the six slots which will be produced by the initial series of tooth which, as pointed out herein above for the particular broach, is 18 in number. Thus either of the broaches herein illustrated, will first cut a number of evenly spaced slots in the bore of the workpiece after which the material between the slots disposed on chordal lines is machined away to produce an approximate diameter, after which the finishing teeth finish the bore wall to a true radius or diameter. A plurality of teeth are provided at the end of the broach of the same diameter which is the finishing diameter, the former one of which will be dressed off first, as the teeth are dressed when they are re-sharpened, so that eventually only the last tooth will be of the exact diameter near the end of the broach life. By machining the bore in sections, that is to say, by first forming the slots therein and thereafter removing the metal from between the slots, the strain on the teeth and wear on the cutting edges is reduced, thereby substantially increasing the life of the broach and the speed of the broaching operation.

What is claimed is:

1. In a broach having a series of lands formed in the body thereof by grooves provided therebetween, the forward section of the broach being tapered, the rear section being cylindrical followed by annular finishing teeth which progressively increase in diameter, spaced flats on the forward tapered section being disposed parallel to the broach axis and of increasing length on the front to the rear lands thereof, flats on the lands of the rear section which slope outwardly and decrease in length on the front to the rear lands thereof, the front section producing spaced slots in a bore, the rear section removing the metal between the slots to machine the bore to substantially the desired diameter, the finishing teeth being annular and increasing in diameter to finish the bore to final diameter.

2. In a broach having a series of lands formed in the body thereof by grooves provided therebetween, the forward section of the broach being tapered, the rear section being cylindrical followed by annular finishing teeth which progressively increase in diameter, spaced flats on the forward tapered section being disposed parallel to the broach axis and of increasing length on the front to the rear lands thereof, flats on the lands of the rear section which slope outwardly and decrease in length on the front to the rear lands thereof, the front section producing spaced slots in a bore, the rear section removing the metal between the slots to machine the bore to substantially the desired diameter, the finishing teeth being annular and increasing in diameter to finish the bore to final diameter, and an extension on the leading end of the body which is releasably securable to a pull head.

3. In a broach having a series of lands formed in the body thereof by grooves provided therebetween, the forward section of the broach being tapered, the rear section being cylindrical followed by annular finishing teeth which progressively increase in diameter, spaced flats on the forward tapered section being disposed parallel to the broach axis and of increasing length on the front to the rear lands thereof, flats on the lands of the rear section which slope outwardly and decrease in length on the front to the rear lands thereof, the front section producing spaced slots in a bore, the rear section removing the metal between the slots to machine the bore to substantially the desired diameter, the finishing teeth being annular and increasing in diameter to finish the bore to final diameter, an extension on the leading end of the body which is releasably securable to a pull head, and an extension on the opposite end of the broach engageable by a handling head.

4. In a broach having a series of lands formed in the body thereof by grooves provided therebetween, the forward section of the broach being tapered, the rear section being cylindrical followed by annular finishing teeth which progressively increase in diameter, spaced flats on the forward tapered section being disposed parallel to the broach axis and of increasing length on the front to the rear lands thereof, flats on the lands of the rear section which slope outwardly and decrease in length on the front to the rear lands thereof, the front section producing spaced slots in a bore, the rear section removing the metal between the slots to machine the bore to substantially the desired diameter, the finishing teeth being annular and increasing in diameter to finish the bore to final diameter, an extension on the leading end of the body which is releasably securable to a pull head, an extension on the opposite end of the broach engageable by a handling head, and a bumper tooth provided forwardly of the cutting teeth.

5. In a broach having a series of lands formed in the body thereof by grooves provided therebetween, the forward section of the broach being tapered, the rear section being cylindrical followed by annular finishing teeth which progressively increase in diameter, spaced flats on the forward tapered section being disposed parallel to the broach axis and of increasing length on the front to the rear lands thereof, flats on the lands of the rear section which slope outwardly and decrease in length on the front to the rear lands thereof, the front section producing spaced slots in a bore, the rear section removing the metal between the slots to machine the bore to substantially the desired diameter, the finishing teeth being annular and increasing in diameter to finish the bore to final diameter, said broach being made of a plurality of separate sections having cylindrical ends, a trough-like body having semi-cylindrical cradles for receiving said cylindrical ends, and means for securing the ends in the cradles.

6. In a broach having a series of spaced grooves forming lands therebetween, a forward section of the broach having the lands increasing in size from the forward to the rear portion thereof, a rearward section of the broach having the lands of the same diameter, finishing lands of progressively increasing diameter, the lands of the forward and rearward section having aligned flats cut thereon, those of the forward section being parallel to the axis of the broach body, those in the rearward section tapering outwardly therefrom.

7. In a broach having a series of spaced grooves forming lands therebetween, a forward section of the broach having the lands increasing in size from the forward to the rear portion thereof, a rearward section of the broach having the lands of the same diameter, finishing lands of progressively increasing diameter, the lands of the forward and rearward section having aligned flats cut thereon, those of the forward section being parallel to the axis of the broach body, those in the rearward section tapering outwardly therefrom, the flats in the forward section increasing in length while those of the rearward section decreasing in length from the front to the rear of the sections.

8. In a broach having a series of spaced grooves forming lands therebetween, a forward section of the broach having the lands increasing in size from the forward to the rear portion thereof, a rearward section of the broach having the lands of the same diameter, finishing lands of progressively increasing diameter, the lands of the forward and rearward section having aligned flats cut thereon, those of the forward section being parallel to the axis of the broach body, those in the rearward section tapering outwardly therefrom, the flats in the forward section increasing in length while those of the rearward section decreasing in length from the front to the rear of the sections, and teeth formed between the flats in the forward section of increasing length from the axis of the broach body to cut spaced slots in the wall of a workpiece being machined.

9. In a broach having a series of spaced grooves forming lands therebetween, a forward section of the broach having the lands increasing in size from the forward to the rear portion thereof, a rearward section of the broach having the lands of the same diameter, finishing lands of progressively increasing diameter, the lands of the forward and rearward section having aligned flats cut thereon, those of the forward section being parallel to the axis of the broach body, those in the rearward section tapering outwardly therefrom, the flats in the forward section increasing in length while those of the rearward section decreasing in length from the front to the rear of the sections, and teeth formed between the flats in the forward section of increasing length from the axis of the broach body to cut spaced slots in the wall of a workpiece being machined, the flats in the rear section of the broach being progressively stepped outwardly from the axis of the broach body to cut the material remaining in the wall between the slots cut therein by the first section.

10. In a broach having a series of spaced grooves forming lands therebetween, a forward section of the broach having the lands increasing in size from the forward to the rear portion thereof, a rearward section of the broach having the lands of the same diameter, finishing lands of progressively increasing diameter, the lands of the forward and rearward section having aligned flats cut thereon, those of the forward section being parallel to the axis of the broach body, those in the rearward section tapering outwardly therefrom, the flats in the forward section increasing in length while those of the rearward section decreasing in length from the front to the rear of the sections, and teeth formed between the flats in the forward section of increasing length from the axis of the broach body to cut spaced slots in the wall of a workpiece being machined, the flats in the rear section of the broach being progressively stepped outwardly from the axis of the broach body to cut the material remaining in the wall between the slots cut therein by the first section, the finishing teeth being annular and of progressively increasing diameter to finish the wall to exact size.

11. In a broach having a series of spaced grooves forming lands therebetween, a forward section of the broach having the lands increasing in size from the forward to the rear portion thereof, a rearward section of the broach having the lands of the same diameter, finishing lands of progressively increasing diameter, the lands of the forward and rearward section having aligned flats cut thereon, those of the forward section being parallel to the axis of the broach body, those in the rearward section tapering outwardly therefrom, the flats in the forward section increasing in length while those of the rearward section decreasing in length from the front to the rear of the sections, teeth formed between the flats in the forward section of increasing length from the axis of the broach body to cut spaced slots in the wall of a workpiece being machined, the flats in the rear section of the broach being progressively stepped outwardly from the axis of the broach body to cut the material remaining in the wall between the slots cut therein by the first section, the finishing teeth being annular and of progressively increasing diameter to finish the wall to exact size, a handling projection on the finishing end of the broach, and a pull projection on the starting end of the broach.

12. In a broach having a series of spaced grooves forming lands therebetween, a forward section of the broach having the lands increasing in size from the forward to the rear portion thereof, a rearward section of the broach having the lands of the same diameter, finishing lands of progressively increasing diameter, the lands of the forward and rearward section having aligned flats cut thereon, those of the forward section being parallel to the axis of the broach body, those in the rearward section tapering outwardly therefrom, the flats in the forward section increasing in length while those of the rearward section decreasing in length from the front to the rear of the sections, teeth formed between the flats in the forward section of progressive increasing length from the axis of the broach body to cut spaced slots in the wall of a workpiece being machined, the flats in the rear section of the broach being progressively stepped outwardly from the axis of the broach body to cut the material remaining in the wall between the slots cut therein by the first section, the finishing teeth being annular and of progressively increasing diameter to finish the wall to exact size, said broach being made into a plurality of sections having projecting cylindrical ends, and a troughlike body having recessed cradles for receiving the cylindrical ends which are secured thereto.

13. In a broach having a series of spaced grooves forming lands therebetween, a forward section of the broach having the lands increasing in size from the forward to the rear portion thereof, a rearward section of the broach having the lands of the same diameter, finishing lands of progressively increasing diameter, the lands of the forward and rearward section having aligned flats cut thereon, those of the forward section being parallel to the axis of the broach body, those in the rearward section tapering outwardly therefrom, the flats in the forward section increasing in length while those of the rearward section decreasing in length from the front to the rear of the sections, teeth formed between the flats in the forward section of progressive increasing length from the axis of the broach body to cut spaced slots in the wall of a workpiece being machined, the flats in the rear section of the broach being progressively stepped outwardly from the axis of the broach body to cut the material remaining in the wall between the slots cut therein by the first section, the finishing teeth being annular and of progressively increasing diameter to finish the wall to exact size, said broach being made into a plurality of sections having projecting cylindrical ends, a troughlike body having recessed cradles for receiving the cylindrical ends which are secured thereto, and additional recessed cradles within the troughlike body engaged by the cylindrical portion provided between certain of the lands near the central portion of each of the sections.

No references cited.

WILLIAM W. DYER, Jr., *Primary Examiner.*

HARRISON L. HINSON, *Examiner.*